United States Patent [19]

Zody et al.

[11] Patent Number: 5,233,032
[45] Date of Patent: * Aug. 3, 1993

[54] HYDROPHOBICALLY MODIFIED HYDROXYBUTYL ETHERS OF POLYGALACTOMANNAN

[75] Inventors: George M. Zody; Michael E. Morgan, both of Louisville, Ky.

[73] Assignee: Stein, Hall & Co., Inc., Jeffersontown, Ky.

[*] Notice: The portion of the term of this patent subsequent to Sep. 26, 2006 has been disclaimed.

[21] Appl. No.: 546,560

[22] Filed: Jun. 29, 1990

[51] Int. Cl.$^5$ ............... C08B 37/00; C07H 15/04
[52] U.S. Cl. ............... 536/114; 536/120; 536/1.11; 536/4.1; 252/8.551
[58] Field of Search ............ 536/114, 120, 1.1

[56] References Cited

U.S. PATENT DOCUMENTS

| | | | |
|---|---|---|---|
| 2,523,708 | 9/1950 | Moe | 536/114 |
| 3,700,612 | 10/1972 | Fath et al. | 536/120 |
| 4,011,393 | 3/1977 | Trapasso | 536/114 |
| 4,076,930 | 2/1978 | Ellingboe et al. | 536/120 |
| 4,870,167 | 9/1989 | Zody et al. | 536/114 |
| 4,960,876 | 10/1990 | Molteni et al. | 536/120 |

FOREIGN PATENT DOCUMENTS 323627 7/1989 European Pat. Off. .

Primary Examiner—Johnnie R. Brown
Assistant Examiner—Everett White
Attorney, Agent, or Firm—Herbert P. Price

[57] ABSTRACT

Polygalactomannans containing a hydroxybutyl ether substituent and a hydrophobic substituent can be used in the fracturing of subterranean formations.

7 Claims, No Drawings

HYDROPHOBICALLY MODIFIED HYDROXYBUTYL ETHERS OF POLYGALACTOMANNAN

CROSS REFERENCE

This application is related to U.S. Pat. No. 4,870,167, which issued Sep. 26, 1989 from U.S. application, Ser. No. 20,876, filed Mar. 2, 1987.

BACKGROUND OF THE INVENTION

The field of art to which this invention pertains is polysaccharide derivatives.

Polygalactomannans and their derivatives are well known compositions which have many uses as thickening agents in aqueous systems.

The polygalactomannans are polysaccharides composed principally of galactose and mannose units and are usually found in the endosperm of leguminous seeds, such as guar, locust bean, honey locust, flame tree and the like. Guar gum, for example, is composed mostly of a polygalactomannan which essentially is a straight chain polymannan with single membered galactose branches. The ratio of galactose to mannose units in the guar polymer is 1:2.

Locust bean gum is a polygalactomannan of similar molecular structure in which the ratio of galactose to mannose is 1:4. Guar and locust bean gums are the preferred sources of the polygalactomannans, principally because of their commercial availability.

Derivatives of polygalactomannan gums are made by reacting the gums with various derivatizing agents, which react with the hydroxyl groups of the gums to form ethers or esters. For example, hydroxyalkyl ethers of polygalactomannans are made by reacting alkylene oxides with the gums as disclosed in U.S. Pat. No. 3,483,121. The galactose and mannose sugar units of polygalactomannans each have an average of three reactive hydroxyl groups. These react with alkylene oxides to produce hydroxyalkyl ethers of the gums. Each unit of alkylene oxide added to the polygalactomannan in turn adds a new hydroxyl group which is itself reactive. Theoretically there is no limit to the amount of alkylene oxide which may be added to the polygalactomannan. As a practical matter, however, a molecular substitution (M.S.) of about 4 or 5 is a practical upper limit.

In our commonly assigned patent, U.S. Pat. No. 4,870,167, we disclose alkyl ethers of polygalactomannans wherein the alkyl groups contain 1 to 4 carbon atoms which are further modified with long chain aliphatic epoxides wherein the long chains contain 8 to about 28 carbon atoms. Such polygalactomannans are particularly useful as thickening agents for aqueous systems.

In European Patent Application No. 323,627, which was published Jul. 7, 1989, polygalactomannan derivatives containing both hydrophilic substituents and hydrophilic substituents are described.

SUMMARY OF THE INVENTION

This invention is directed to derivatives of polygalactomannans. In one aspect, this invention pertains to derivatives of polygalactomannans which contain both hydrophilic and hydrophobic substituents. In another aspect, this invention relates to an oil well fracturing process using the polygalactomannan derivatives.

The compositions of this invention are poly(alkyl ethers) of polygalactomannans having at least two different alkyl ether substituents, one of which is hydrophilic, the other hydrophobic. The hydrophilic group is 2-hydroxybutyl ether. The hydrophobic group is selected from the group consisting of RO, HOR$^1$O, and

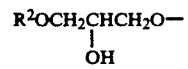

wherein R is an alkyl group which contains about 8 to about 28 carbon atoms, wherein R$^1$ is an alkylene group which contains about 8 to about 28 carbon atoms having the OH group on the carbon atom beta to the ether group, and wherein R$^2$ is an alkylene group containing about 5 to about 25 carbon atoms. The hydroxybutyl substituent is present in a M.S. of about 0.2 to about 1. The other alkyl substituent, i.e., the hydrophobic substituent, is present in a M.S. of about 0.001 to about 0.2.

The compositions of this invention are efficient thickening agents for aqueous systems either alone or combined with a surfactant. These compositions are particularly useful in fracturing subterranean wells.

DESCRIPTION OF THE INVENTION

In our patent, U.S. Pat. No. 4,870,167, we describe and claim poly(alkyl ethers) of polygalactomannans having at least two different alkyl substituents, wherein one substituent is hydrophilic and the other hydrophobic. The hydrophilic substituent can be a hydroxyalkyl group having 2 to 4 carbon atoms which is present in a M.S. of about 0.3 to about 1.5. The hydroxyalkyl group is derived from ethylene oxide, propylene oxide and butylene oxide reacted with the polygalactomannan under alkaline conditions. As pointed out in our patent, the preferred hydrophilic groups are methyl, hydroxyethyl and hydroxypropyl having an M.S. of 0.5 to 1.5 with the most preferred being hydroxypropyl of M.S. 0.6 to 1.2.

In preparing the double derivative containing both hydrophilic groups and hydrophobic groups, the hydrophilic group reagent is reacted first with the polygalactomannan followed by the hydrophobic group reagent. It is necessary in order for the second reaction to take place that the hydrophobic reagent be compatible with the hydrophilic derivatized polygalactomannan. To obtain the required compatibility, a solvent which is miscible with the hydrophobic reagent and which swells the hydrophilically substituted polygalactomannan is needed. However, in reactions involving polygalactomannans containing short chain substituents, i.e., less than 4 carbon atoms, at low M.S.—less than 0.5—, it is very difficult to obtain sufficient compatibility with the hydrophobic reagent for any reaction to take place. Very long reaction times and high temperatures are required to force some of the hydrophobic reagent to react. Conditions required to force the reaction also cause degradation of the galactomannan base polymer.

It has been found that 2-hydroxybutyl polygalactomannan having a M.S. as low is about 0.2 can be readily derivatized with a hydrophobic reagent whereas 2-hydroxypropyl polygalactomannan having a M.S. of about 0.6 or lower is difficult to derivatize.

The utility of polygalactomannans is enhanced by their capability of being crosslinked to form gelled compositions and their degradability by enzymes. However, as the molecular substitution of polygalactomannans increases above about 0.4, the crosslink performance decreases due to the lack of available cis hydroxyls on the polygalactomannan backbone. Also as the M.S. increases, the enzymatic degradation of the polymer chain is decreased due to steric hindrance. For example, hydroxypropyl guar having a M.S. of 0.8 or higher cannot be easily degraded with enzymes in aqueous media. Its ability to be crosslinked is also reduced.

The hydroxypropyl, hydroxy-longchain alkyl ethers of guar gum wherein the hydroxypropyl hydroxy group has a M.S. of at least 0.5, although valuable and useful in many applications, have limited usefulness in hydraulic fracturing of wells wherein enzymatic degradation of the gum is used. The corresponding hydroxybutyl derivative with a M.S. of about 0.2 to about 0.5 can be enzymaticallly degraded and readily crosslinks with the various crosslinking agents.

The compositions of this invention are made by reacting the polygalactomannan, preferably guar gum or locust bean gum, with butylene oxide to form the 2-hydroxybutyl derivative and then with a long aliphatic chain epoxy compound which contains about 8 to about 28 carbon atoms in the alkyl group. Examples of such epoxy compounds are 1,2-epoxyoctane, 1,2-epoxy dodecane, 1,2-epoxyhexadecane, 1,2-epoxytetracosane, and the like. Other useful long chain epoxy compounds are glycidyl ethers of aliphatic alcohols wherein the aliphatic alcohols contain about 5 to about 25 carbon atoms. Examples of such glycidyl ethers are the glycidyl ethers of amyl alcohol, hexanol, octanol, lauryl alcohol, stearyl alcohol, lignoceryl alcohol and the like. Examples of useful alkyl halides are octyl chlorides, decyl bromide, dodecyl iodide, hexadecyl bromide, and the like.

The M.S. of the hydroxybutyl group of the composition of this invention is about 0.2 to about 1 and, preferably, about 0.3 to about 0.5. The M.S. of the long chain aliphatic group is about 0.001 to about 0.2 and, preferably, about 0.005 to about 0.1.

The process used to form the compositions of our invention is described in detail in our U.S. Pat. No. 4,870,167, which is hereby incorporated by reference.

The viscosity of aqueous solutions of the compositions of this invention is enhanced by the addition of surfactants. The viscosity is increased by the addition of very small amounts of surfactant, i.e., 1 drop of surfactant in 400 mls of a 0.5 weight percent aqueous solution of the gum. Generally about 10 ppm of surfactant up to about 1 weight percent of surfactant is used based on the weight of the aqueous solution. Preferably, about 0.01 to about 0.2 weight percent is used.

Any water soluble surfactant can be used in this invention. The preferred surfactants have an HLB of at least 7 and, more preferably, at least 10.

Examples of suitable anionic surfactants are alkali metal, ammonium and amine soaps, such as sodium and potassium myrisate, laurate, palmitate, oleate, stearate, resinate and hydoabietate, the alkali metal alkyl or alkylene sulfates, such as sodium lauryl sulfate, potassium stearyl-sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof.

Other examples of suitable anionic surfactants are alkali metal salts of alkyl-aryl sulfonic acids, sodium dialkyl sulfosuccinate, sulfated or sulfonated oils, sulfonated tallow and alkali salts of short chain petroleum sulfonic acids.

Examples of nonionic surfactants are condensation products of higher fatty alcohols with ethylene oxide, such as the reaction of oleyl alcohol with 10 ethylene oxide units, condensation products of alkyl phenols with ethylene oxide, such as the reaction product of isooctylphenol with 12 ethylene oxide units; condensation products of higher fatty acid amides with 5 or more ethylene oxide units; polyethylene glycol ethers of long chain fatty acids, such as tetraethylene glycol monopalmitate, ethylene oxide condensation products of polyhydric alcohol partial higher fatty esters, and their inner anhydrides (mannitol-anhydride, called Mannitan and sobitol-anhydride called Sorbitan), and glycerol monopalmitate reacted with 10 molecules of ethylene oxide; long chain polyglycols in which one hydroxyl groups is esterified with a higher fatty acid and the other hydroxyl group is etherified with a low molecular weight alcohol, such as methoxypolyethylene glycol 550 monostearate (550 being the average molecular weight of the polyglycol ether). A combination of two or more of these surfactants can be used.

Useful cationic surfactants include primary, secondary and tertiary fatty amines, such as cocamine, tallowamine, distearyl amine, and methyldilauryl amine; N-alkyl trimethylene diamine, fatty amino propyl amines; fatty alkanolamides; quaternary ammonium compounds, such as alkyl dimethyl benzyl ammonium chloride and dicocodimethyl ammonium chloride.

Also included as being useful are the amphoteric surfactants, such as lauryl and stearyl betaines.

The compositions of this invention in aqueous solutions can be crosslinked using any of the known crosslinkers for polygalactomannans. Examples of such crosslinkers are boron compounds, e.g., borax, transition metal chelates and salts, e.g., titanium, zirconium and antimony compounds. The crosslinking reaction is described in detail in U.S. Pat. No. 3,301,723 which is hereby incorporated by reference.

The compounds of this invention are particularly useful in the process of fracturing subterranean formations penetrated by a borehole. In this process, a water based fluid is injected into the borehole and into contact with the formation at a rate and pressure sufficient to fracture the formation. The water based fluid is made from (a) an aqueous liquid, (b) as a thickening agent to increase the viscosity of the aqueous liquid, a viscosity increasing amount of the composition of this invention, and (c) as a breaker to reduce the viscosity of the fluid after the fluid has contacted the formation and after its intended purpose as a viscous fluid has been served, an effective amount of an enzyme.

In the fracturing process, about 10 to about 80 pounds of hydrophilic hydrophobic polygalactomannan are used per 1000 gallons of aqueous fluid, and, preferably, about 20 to about 60 pounds.

The composition of this invention particularly useful in the fracturing process is guar gum substituted with the 2-hydroxybutyl ether group having an M.S. of about 0.3 to about 0.5 and a hydrophobic group as hereinabove defined having an M.S. of about 0.005 to about 0.1.

The use of enzymes to reduce the viscosity of polygalactomannans is well known and is described in such patents as U.S. Pat. No. 4,202,795, U.S. Pat. No. 4,682,654, U.S. Pat. No. 4,693,982 and U.S. Pat. No. 3,684,710, all of which are incorporated by reference.

The fracturing fluid can be thickened using surfactants and/or crosslinking agents as discussed hereinabove.

The invention is described in more detail by the following examples. Parts and percentages are by weight unless otherwise designated.

EXAMPLE 1

To a suitable reactor were added 1760 parts of deionized water, 168 parts of a 50 percent aqueous solution of sodium hydroxide, and 2 parts of borax. Heat was applied raising the temperature in the reactor to 190° F. Double purified guar splits, 2000 parts, were then added. The reactor was purged three times with nitrogen. The reactor was then pressurized with nitrogen to 10 psig. After 10 minutes, the temperature was adjusted to 140° F. and a vacuum of −10 inches of Hg was applied. Butylene oxide was then slowly introduced into the reactor while holding the temperature at 140° F. and keeping the pressure at no higher than 10 psig. The butylene oxide, 560 parts, was added over a three hour period with the temperature between 140° and 150° F. The reactor was then evacuated to −5" Hg and the vacuum was held for one hour. Nitrogen to 10 psig was added and the reactants were cooled to 120° F. The hydroxybutylated guar product was discharged from the reactor and was washed twice with water in a volume ratio of 10:1 water to product. The product was then centrifuged to a moisture content of 66.5 percent. The product was milled using an air inlet temperature of 400° F. followed by a second milling with inlet air at 550° F. The resulting product had a moisture content of 9.4 percent and a M.S. (hydroxybutyl substitution) of 0.31.

EXAMPLE 2

To a suitable reactor were added 90 parts hydroxybutyl guar from Example 1, 130 parts of isopropanol, 2 parts of ammonium lauryl sulfate 36 parts of deionized water, and 18 parts of 1,2-epoxyhexadecane. Agitation was started and sparging with nitrogen was conducted for 1 hour. The temperature was raised to 70° C. and 3.15 parts of potassium hydroxide pellets were added. Heating at 70° C. was continued for 3 hours. The reactants were cooled to 25° C. and the liquid was decanted from the solid derivatized guar. The product was washed twice with acetone, was filtered to remove excess liquid, and was allowed to air dry.

EXAMPLE 3

To a suitable reactor were added 24.3 parts of a $C_{20}$-$C_{24}$ alpha olefin oxide having an epoxide equivalent weight of 324, 130 parts of isopropanol and 2 parts of ammonium lauryl sulfate. Heat was applied to melt and dissolve the olefin oxide in the alcohol. At 48° C., 36 parts of deionized water were added. After heating at 48°-50° C. for 15 minutes, a clear solution was obtained and 90 parts of hydroxybutyl guar from Example 1 were added. The reactor was sparged with nitrogen for 30 minutes. The temperature was raised to 70° C. and 3.15 parts of potassium hydroxide pellets were added. The temperature was held at 70° C. for 2 hours. The reactants were then cooled and were washed three times with hexane, followed by three washes with acetone. The excess liquid was drawn off on a filter and the product was air dried.

EXAMPLE 4

To a suitable reactor were added 90 parts of hydoxybutyl guar, 130 parts of isopropanol, 2 parts of ammonium lauryl sulfate, 36 parts of deionized water and 23.3 parts of 1-bromohexadecane. After sparging for 1 hour with nitrogen, the temperature was raised to 70° C. and 3.15 parts of potassium hydroxide pellets were added. The temperature was held at 70° C. for 1 hour, after which time 31 parts of product were removed. After heating at 70° C. for one more hour, another 31 parts portion was removed. The remaining potion was heated for 1 more hour at 70° C. Each portion was then washed 3 times with acetone and was air dried.

The products were identified as A, B, and C corresponding to the 1, 2 and 3 hour reaction times.

EXAMPLE 5

To a suitable reactor were added 1760 parts of deionized water, 168 parts of a 50 percent aqueous sodium hydroxide solution and 2 parts of borax. The temperature was raised to 180° F. and 2000 parts of double purified splits were added. The reactor was purged 3 times with nitrogen and nitrogen was added to a pressure of 10 psig. After holding the pressure for 10 minutes, the temperature was adjusted to 160° F. and the reactor was evacuated to −10 in. Hg. The addition of 560 parts of butylene oxide was begun and continued over 1 hour and 30 minutes with the temperature rising from 161° F. to 178° F. The temperature was lowered to 140° F., at which point a solution of 150 parts of 1,2-epoxyhexadecane in 500 parts of isopropanol was added. After holding at 140° F. for 30 minutes, the temperature was raised to 170° F. and was held for 2 hours. The temperature was then lowered to 78° F. The product was discharged from the reactor and was washed twice with water at a 10 to 1 water to product ratio. The washed product was centrifuged to a moisture content of 68.4 percent and was then milled using inlet air of 550° F. The resulting product had a moisture content of 8.9 percent and a mesh size of less than 150 (U.S. Standard Sieve).

EXAMPLE 6

Half percent solutions of the derivatized guar from Examples 2, 3, 4 and 5 were made in deionized water. The pH of the solutions was adjusted to 6.0 with hydrochloric acid. The solutions were stirred for one hour. To 400 parts of each solution were added 0.2 part of a 28 percent solution of ammonium lauryl sulfate (ALS) in water. The viscosity was then determined using a Brookfield viscometer at 20 RPM. After each viscosity determination, additional ammonium lauryl sulfate was added in 0.2 part increments and the viscosity was determined after each addition. The viscosity determination are shown in the Table.

TABLE

| ALS part | Example | | | | | |
|---|---|---|---|---|---|---|
| | 2 | 3 | 4A | 4B | 4C | 5 |
| | VISC cps | VISC cps | VISC cps | VISC cps | VISC cps | VISC cps |
| 0.2 | 905 | 3020 | 780 | 1160 | 2020 | |
| 0.4 | 4,150 | 3320 | 1,444 | 36020 | 5,500 | 1032 |
| 0.6 | 6,680 | 2900 | 2,240 | 5200 | 7420 | |
| 0.8 | 6,900 | 2,400 | 3,068 | 6450 | 8,200 | 4205 |
| 1.0 | 7,200 | 1,848 | 3,690 | 6800 | 8,680 | 6210 |
| 1.2 | 7920 | 1,40 | 3,080 | 6430 | 8,400 | 7570 |

TABLE-continued

| ALS part | Example | | | | | |
|---|---|---|---|---|---|---|
| | 2 | 3 | 4A | 4B | 4C | 5 |
| | VISC cps | VISC cps | VISC cps | VISC cps | VISC cps | VISC cps |
| 1.4 | 8900 | | 2,400 | 3,500 | 6,960 | 8320 |
| 1.6 | 9100 | | | 6,820 | | 7920 |
| 1.8 | 8940 | | | | | |
| 2.0 | 8900 | | | | | 4910 |
| 2.2 | 8,000 | | | | | |
| 2.4 | | | | | | 2750 |
| 2.8 | | | | | | 1805 |
| 3.2 | | | | | | 1340 |
| 4.0 | | | | | | 876 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A poly(alkylether) of a polygalactomannan having two different alkyl ether substituents, one of which is hydrophilic, the other of which is hydrophobic, wherein the hydrophilic substituent is 2-hydroxybutyl ether, wherein the hydrophobic substituent is selected from the group consisting of RO—, HOR$^1$O— and

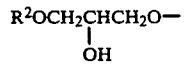

wherein R is an alkyl group containing about 8 to about 28 carbon atoms, wherein R$^1$ is an alkylene group containing about 8 to about 28 carbon atoms having the OH group on the carbon atom beta to the ether group and wherein R$^2$ is an alkyl group containing about 5 to about 25 carbon atoms, wherein the hydrophilic substituent is present in a M.S. of about 0.2 to about 1, and wherein the hydrophobic substituent is present in a M.S. of about 0.001 to about 0.2.

2. The poly(alkylether) of a polygalactomannan of claim 1 wherein the polygalactomannan is guar gum.

3. The poly(alkylether) of a polygalactomannan of claim 1 wherein the polygalactomannan is locust bean gum.

4. The poly(alkylether) of a polygalactomannan of claim 1 wherein the HOR$^1$O group is the hydroxydodecyl ether group.

5. The poly(alkyl ether) of a polygalactomannan of claim 1 wherein the HOR$^1$O group is the hydroxyhexyldecyl ether group.

6. The poly (alkyl ether) of a polygalactomannan of claim 1 wherein the M.S. of the 2-hydroxybutyl ether group is about 0.3 to about 0.5.

7. The poly (alkyl ether) of a polygalactomannan of claim 1 wherein the M.S. of the hydrophobic substituent is about 0.005 to about 0.1.

* * * * *